(12) United States Patent
Wolle et al.

(10) Patent No.: US 11,820,411 B2
(45) Date of Patent: Nov. 21, 2023

(54) TRANSPORT VEHICLE AND TRANSPORT DEVICE

(71) Applicant: TANOS GmbH Verpacken Ordnen, Illertissen (DE)

(72) Inventors: Lutz Wolle, Burlafingen (DE); Tjeerd Jan Pieter Gerbranda, Leipheim (DE); Ingo Michelmann, Ulm (DE)

(73) Assignee: TANOS GmbH Verpacken Ordnen Präsentieren, Illertissen (DE)

( * ) Notice: Subject to any disclaimer, the term of this patent is extended or adjusted under 35 U.S.C. 154(b) by 417 days.

(21) Appl. No.: 17/058,856

(22) PCT Filed: Jun. 1, 2018

(86) PCT No.: PCT/EP2018/064483
§ 371 (c)(1),
(2) Date: Nov. 25, 2020

(87) PCT Pub. No.: WO2019/228646
PCT Pub. Date: Dec. 5, 2019

(65) Prior Publication Data
US 2021/0221416 A1  Jul. 22, 2021

(51) Int. Cl.
| | |
|---|---|
| *B62B 1/26* | (2006.01) |
| *A47B 13/02* | (2006.01) |
| *A47B 83/04* | (2006.01) |
| *B25H 1/04* | (2006.01) |
| *B62B 1/14* | (2006.01) |
| *A47B 3/08* | (2006.01) |
| *B62B 1/00* | (2006.01) |

(52) U.S. Cl.
CPC ............... *B62B 1/26* (2013.01); *A47B 13/02* (2013.01); *A47B 83/045* (2013.01); *B25H 1/04* (2013.01); *B62B 1/14* (2013.01); *A47B 3/08* (2013.01); *B62B 1/008* (2013.01)

(58) Field of Classification Search
CPC .. B62B 1/26; B62B 1/14; B62B 1/008; A47B 13/02; A47B 83/045; A47B 3/08; B25H 1/04
See application file for complete search history.

(56) References Cited

U.S. PATENT DOCUMENTS

| | | | | |
|---|---|---|---|---|
| 6,296,262 | B1 * | 10/2001 | Skinner | B62B 3/108 280/35 |
| 6,386,557 | B1 * | 5/2002 | Weldon | B62B 1/264 280/654 |
| 6,543,796 | B1 | 4/2003 | Johnson et al. | |
| 6,886,557 | B2 | 5/2005 | Childers et al. | |
| 7,367,571 | B1 | 5/2008 | Nichols | |
| 2014/0110447 | A1 * | 4/2014 | Hilley | B62B 1/26 224/401 |

FOREIGN PATENT DOCUMENTS

| | | |
|---|---|---|
| DE | 202007002551 U1 | 7/2007 |
| EP | 2315701 A1 | 5/2011 |

OTHER PUBLICATIONS

"Sys-Roll", Systainer, Verpacken Ordnen Prasentieren Transportieren, Tanos GmbH, 2 pages, 2014/2015.

* cited by examiner

*Primary Examiner* — Bryan A Evans
(74) *Attorney, Agent, or Firm* — Hoffmann & Baron, LLP

(57) ABSTRACT

A transport vehicle with a horizontally oriented integrated table which is arranged at the upper end of a vertical frame section and forms the upper end of the vehicle body.

14 Claims, 9 Drawing Sheets

TRANSPORT VEHICLE AND TRANSPORT DEVICE

This application claims priority based on an International Application filed under the Patent Cooperation Treaty, PCT/EP2018/064483, filed on Jun. 1, 2018.

BACKGROUND OF THE INVENTION

The invention relates to a transport vehicle, comprising:
a vehicle body having a lower section and a vertical frame section extending upwardly from the lower section, the lower section having a support surface and a container attachment interface for attaching a box-shaped container placed on the storage surface to the lower section without altering the vertical frame section,
a handle arranged on the vehicle body, with which handle the transport vehicle can be moved into a tilted position, and
two wheels located on the lower section, with which wheels the transport vehicle can be supported against a floor and moved relative to the floor in the tilted position.

Such a transport vehicle is known from the state of the art. For example, the product "Sys-Roll" available from the company TANOS GmbH is known as a transport vehicle for the transport of box-shaped containers.

The transport vehicle mentioned at the beginning is typically used to transport one or more box-shaped containers to a job site, for example a construction site. The box-shaped container is usually used to store tools, for example a power tool, and/or tool accessories. In particular, the box-shaped containers are designed in such a way that they can be stacked on top of each other and coupled together in a vertically tension-proof manner to form a stable vertical, in particular cuboid, stack. To this end, each box-shaped container has the same horizontal layout and has couplers enabling them to be coupled together. The stack can be placed with the lowest box-shaped container on the support surface of the transport vehicle and attached by means of the container attachment interface. Expediently, the stack is attached to the transport vehicle with only the lowest box-shaped container. The vehicle body, especially the vertical frame section, represents a permanently integral structure; i.e. the vehicle body, especially the vertical frame section, remains unchanged in its structure when a box-shaped container is attached and removed. The box-shaped container can be removed from and/or attached to the transport vehicle without the use of tools.

The transport vehicle can be manually moved to a tilting position in which the transport vehicle is tilted with respect to the ground about a tilting axis defined by the wheels. In this position, the transport vehicle can be moved, especially pushed or pulled, in the manner of a sack truck. The transport vehicle can also be described as a sack truck or "sack truck like".

A combination of the transport vehicle and the goods to be transported with it, for example the box-shaped container mentioned above, shall be referred to as transport device.

SUMMARY OF THE INVENTION

It is an object of the invention to provide the transport vehicle with an additional function while retaining its compact and simple structure.

The object is solved by a transport vehicle according to claim 1. The transport vehicle comprises a horizontally oriented, integrated table, which is arranged at the upper end of the vertical frame section and forms the upper end of the vehicle body.

Thus, the transport vehicle can be used not only for transporting box-shaped containers but can also be used as a worktable. The integrated table forms the upper end of the vehicle body, so that the compact and simple structure of the transport vehicle can be maintained.

Advantageous further embodiments are defined in the subclaims.

BRIEF DESCRIPTION OF THE DRAWINGS

Exemplary details and embodiments are explained below with reference to the figures. Thereby shows.

DETAILED DESCRIPTION

In the following explanations, reference is made to the x-direction, y-direction and z-direction drawn in the figures. The x-direction, y-direction and z-direction are orthogonal to each other. The x-direction can also be referred to as transverse direction, the y-direction as longitudinal direction and the z-direction as vertical direction. Furthermore, the x-direction and the y-direction can also be called horizontal directions. The reference system for the directions is the transport vehicle 2 or the transport device 1 in an upright position.

Figure 1:
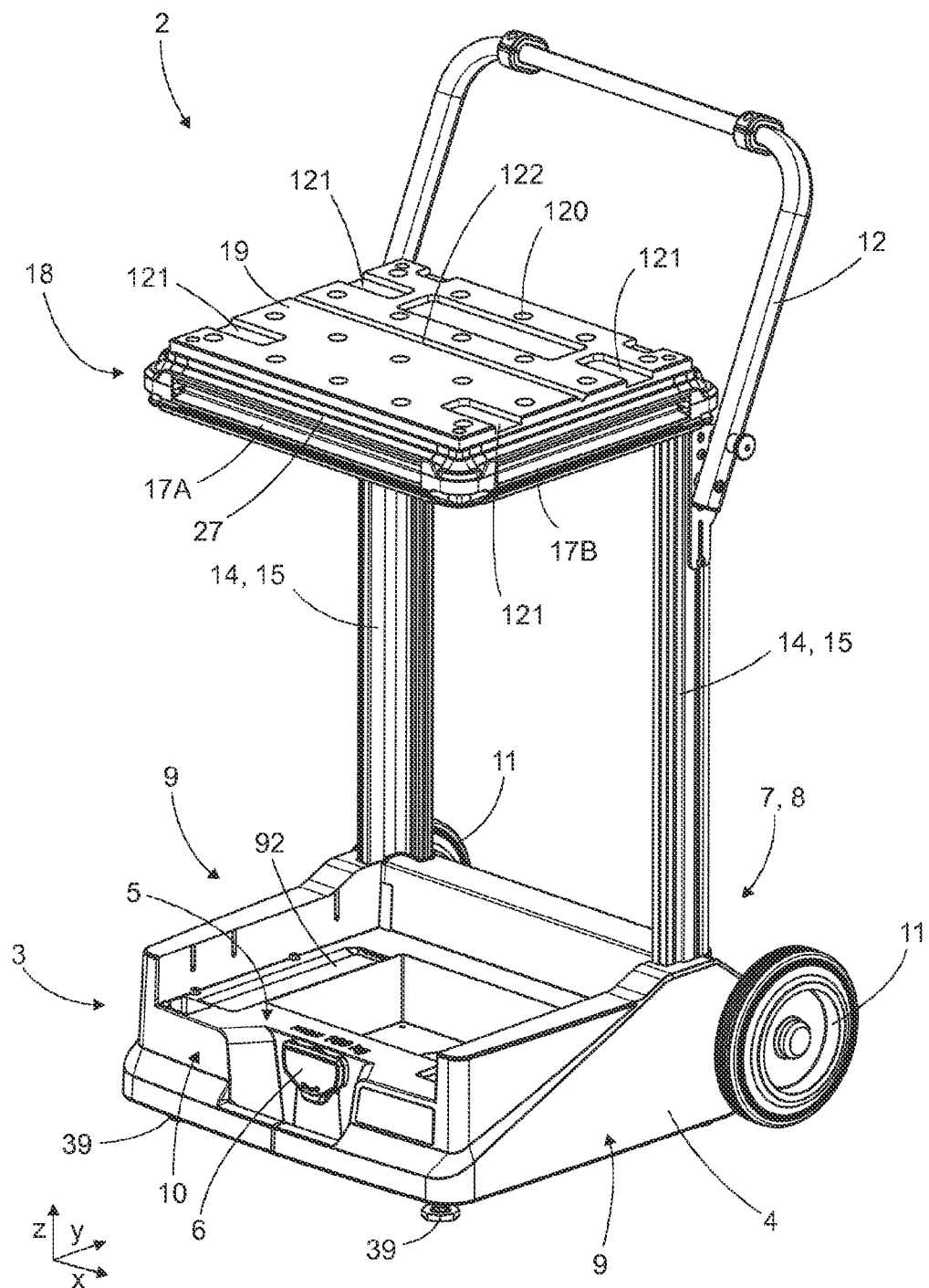
FIG. 1 a perspective view of a transport vehicle,
FIG. 2 another perspective view of the transport vehicle,
FIG. 3 a perspective view of a transport device in a transport configuration,
FIG. 4 a rear view of the transport vehicle,
FIG. 5 a perspective rear view of the transport vehicle,
FIG. 6 a detailed view of a first attachment device of the transport vehicle,
FIG. 7 a perspective view of the transport device in a working configuration,
FIG. 8 another perspective view of the transport device in the working configuration,
FIG. 9 a perspective view of a box-shaped container,
FIG. 10 a vertical sectional view through a container attached to a container attachment interface.
Figure 2:
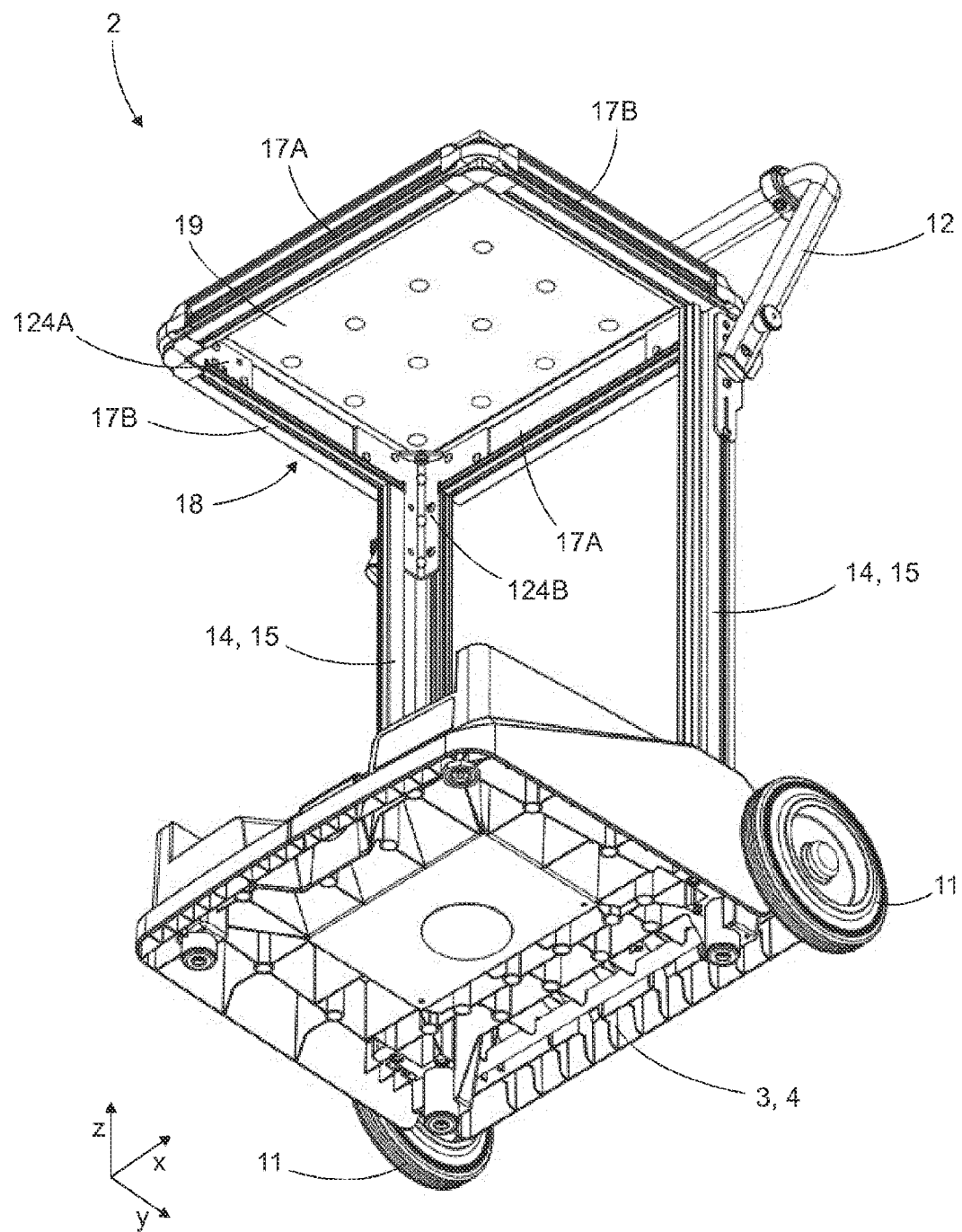
Figure 3:
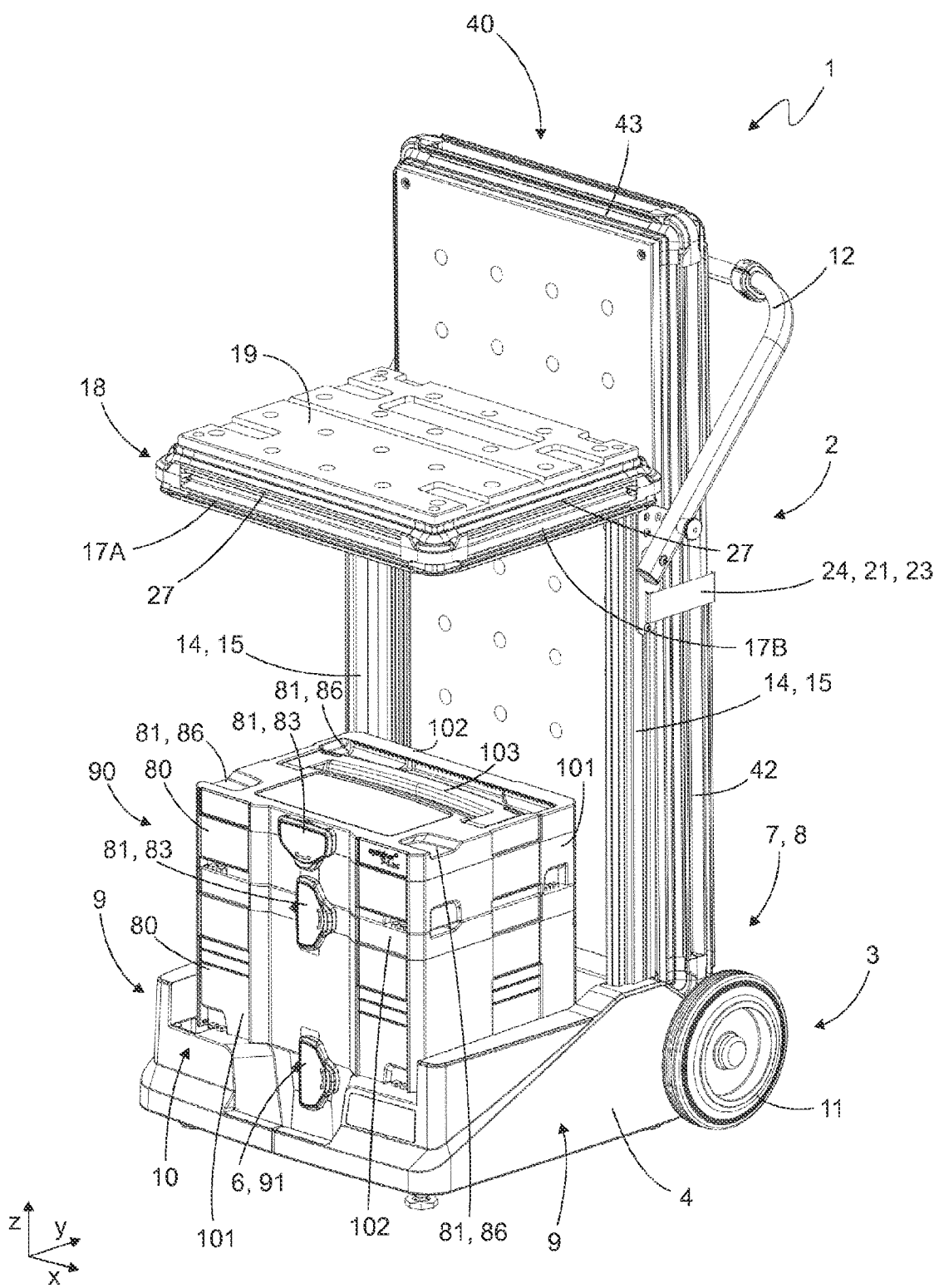

FIGS. 1 and 2 show a transport vehicle 2. The transport vehicle 2 comprises a vehicle body with a lower section 3 and a vertical frame section 14 extending upward from the lower section 3. The lower section 3 has a support surface 5 and a container attachment interface 6. The container attachment interface allows a box-shaped container 80 placed on the support surface 5 to be attached to the lower section 3. An example of such a container 80 is shown in FIG. 3. For attaching or removing the box-shaped container 80, no modification, especially no conversion, of the vertical frame section 14 is required.

The transport vehicle 2 further comprises a handle 12 arranged on the vehicle body, in particular on the vertical frame section 14, with which handle 12 the transport vehicle 2 can be moved into a tilted position. Furthermore, the transport vehicle 2 comprises two wheels 11 arranged on the lower section 3, by means of which wheels 11 the transport vehicle 2 can be supported in the tilted position with respect to a floor and moved relative to the floor.

The transport vehicle further includes a horizontally oriented integrated table 18, which is located at the top of the vertical frame section 14 and forms the upper end of the vehicle body.

Further exemplary details are explained below.

First to the basic construction of the transport vehicle 2:

The transport vehicle 2 has a transverse front side 10, two longitudinal sides 9 and a transverse rear side 8. The lower section 3 is exemplarily formed by a bottom part 4, which has an essentially cuboid, especially flat basic shape. The y-extension and the x-extension of the bottom part 4 are each at least twice as large as the z-extension of the bottom part 4. The bottom part 4 has on its underside one, two or more feet 39, with which the transport vehicle 2 stands stably on a flat floor in the standing position. A respective wheel 11 is arranged on each of the longitudinal sides 9 of the bottom part 4, namely in the rearward area 7 of the transport vehicle 2, i.e. near the rear side 8. The two wheels 11 have coaxially arranged axes of rotation aligned in the x-direction.

The transport vehicle 2 can assume a standing position, in which it stands stable on the floor. In the standing position the lower section 3 is parallel to the floor 30 and the vertical frame section 14 is perpendicular to the floor 30. In the standing position, the transport vehicle 2 expediently stands only on the feet 39 and especially not on the wheels 11. The transport vehicle 2 can further assume a driving position in which it is tilted relative to the floor, for example by approximately 45 degrees. In the driving position, the transport vehicle 2 can be set in motion by manual pushing or pulling. The transport vehicle 2 can therefore be handled like a sack truck and can also be described as sack truck like.

The vehicle body, for example consisting of the lower section 3, the vertical frame section 14 and the integrated table 18, has in a y-z-side view essentially the shape of a U turned by 90 degrees or the shape of a C. The lower section 3 and the integrated table 18 each represent horizontal legs in a y-z-side view, which are connected by the vertical frame section 14, expediently only by the vertical frame section 14.

The lower section 3 and the vertical frame section 14 together (without the handle 12) form an essentially L-shaped structure in a y-z side view.

The extension of the vertical frame section 14 in z-direction is greater than the extension of the lower section 3 in y-direction and greater than the extension of the integrated table 18 in y-direction. The y-extension of the lower section 3 corresponds to the y-extension of the integrated table 18. The vertical frame section 14 preferably occupies at least 60%, in particular at least 70% of the z-extension of the vehicle body or the transport vehicle 2 without the handle 12.

The vertical frame section 14 is located in the rearward area 7 of the transport vehicle 2. Expediently, the integrated table 18 is supported in relation to the lower section 3 only by the vertical frame section 14 located in the rearward area 7. Between the integrated table 18 and the lower section 3 there is thus a completely free volume in front of the vertical frame section 14 in the y-direction to accommodate one or more box-shaped containers 80. Except for the frame section 14 arranged in the rearward area 7, the volume available between the integrated table 18 and the bottom part 4 is preferably completely free.

The vehicle body comprising the lower section 3, the vertical frame section 14 and the integrated table 18 preferably represents a permanently integral structure that remains unchanged when a box-shaped container 80 is removed and/or attached at the container attachment interface 6. No modification of the vehicle body, in particular of the vertical frame section 14 and/or the integrated table 18, is necessary to remove and/or attach the box-shaped container 80 at the container attachment interface 6. Expediently, the integrated table 18 and/or the vertical frame section 14 cannot be removed from the vehicle body without the use of tools.

The vertical frame section 14 spans an x-z-plane. As an example, the vertical frame section 14 comprises two elongated, parallel vertical frame elements 15 extending vertically upwards from the lower section 3. Preferably, the vertical frame section 14 consists of the two frame elements 15.

The two vertical frame elements 15 each occupy the same y and z range and are offset from each other in the x direction. The vertical frame elements 15 are arranged in the y-direction near the rear side 8, i.e. in the rearward area 7, and are located in the x-direction in the area of the longitudinal sides 9. The two vertical frame elements 15 are attached to the upper side of the bottom part 4 and extend vertically upwards.

The vertical frame elements 15 are for example designed as profiles, especially as metal profiles.

The table 18 integrated in the vehicle body follows the vertical frame section 14 in the z-direction. The integrated table 18 represents the vertical upper end of the vehicle body—i.e. in particular the transport vehicle 2 without the handle 12. The integrated table 18 is the highest vertical point of the transport vehicle 2 without the handle 12.

The integrated table 18 comprises a horizontal frame section with at least one horizontal frame element 17A. The horizontal frame element 17A is located at the upper end of the vertical frame section 14. The integrated table 18 further comprises a table top 19, which is arranged on the horizontal frame element 17A, in particular placed on top thereof.

The table top 19 is rectangular for example. On its upper side the table top 19 has an exemplary hole grid 120 with regularly spaced holes. The holes serve, for example, for the attachment of clamping elements (not shown in the figures) with which, for example, a workpiece can be fixed to the integrated table. As an example, the table top 19 further has recesses 121 on its upper side to accommodate the feet of a container (not shown in the figures). The recesses are exemplarily rectangular and arranged in the corner areas of the table top 19. Furthermore, the table top 19 has an exemplary groove 122 running over the upper side of the table top 19. The groove is preferably designed as a V-groove and is used in particular for fixing workpieces. Expediently, the v-groove extends over the entire x-extension of the table top 19.

As mentioned above, the integrated table 18 comprises a horizontal frame section with at least one elongated horizontal frame element 17A on which the table top 19 is arranged. The horizontal frame element 17A extends from the upper end of one vertical frame element 15 to the upper end of the other vertical frame element 15.

The integrated table 18, in particular the horizontal frame section, exemplarily the horizontal frame element 17A, thus serves as stiffening element for the vertical frame section 14. Between the integrated table 18 and the bottom part 4, there are expediently no further stiffening elements between the two vertical frame elements 15.

For example, in addition to the aforementioned horizontal frame element 17A, the horizontal frame section comprises three further elongated horizontal frame elements 17A, 17B.

The integrated table 18 thus has four elongate, horizontal frame elements 17A, 17B. The horizontal frame elements 17A, 17B are exemplary profiles, especially metal profiles. The frame elements 17 together form the horizontal frame section in the form of a rectangular frame on which the table top 19 of the integrated table 18 is arranged, in particular placed. The integrated table 18 occupies essentially the same x-y range as the lower section 3. The integrated table 18 has a cuboid, especially flat basic shape.

As shown in FIG. 2, the two horizontal frame elements 17A are aligned parallel to the x-direction and the two horizontal frame elements 17B are aligned parallel to the y-direction. The frame element 17A, aligned parallel to the x-direction, connects the two vertical frame elements 15 at their upper end and forms an inverted U together with the two frame elements 15 in x-z side view. The two frame elements 17B, aligned parallel to the y-direction, extend from the upper ends of the vertical frame elements 15 forward in the y-direction.

The horizontal frame section defines an x-y plane orthogonal to the x-z plane defined by the vertical frame section 14. The horizontal frame section is attached to the upper end of the vertical frame section 14, for example to the two vertical frame elements 15. The integrated table 18 is attached to the vertical frame elements 15, in particular with its two rear corner sections.

The horizontal frame section has four corner elements, which are arranged at the corners of the horizontal frame section and each connect a horizontal frame element 17A with a horizontal frame element 17B. As an example, each corner element has two openings aligned at 90 degrees to each other. In one of the openings one end of a horizontal frame element 17A is inserted and in the other opening one end of a horizontal frame element 17B is inserted. The corner elements are preferably made of plastic.

As shown in FIG. 2, the horizontal frame elements 17A, 17B are further attached to each other by means of angle connectors 124A, 124B. The angle connectors 124A, 124B are arranged on the inward facing sides of the horizontal frame elements 17A, 17B. The angle connectors 124A and 124B each connect a horizontal frame element 17A with a horizontal frame element 17B. The angle connectors 124B expediently further serve to attach the horizontal frame section to the vertical frame section 14. Expediently, the angle connectors 124A are designed as two-legged, L-shaped angle connectors and preferably connect just one horizontal frame element 17A with one horizontal frame element 17B. The angle connectors 124B are preferably designed as three-legged angle connectors and each connect a horizontal frame element 17A and a horizontal frame element 17B with a vertical frame element 15.

Preferably, the integrated table 18 is equipped with a support section 27, on which a worktable 40, which is explained below, can be supported in a horizontal orientation with an attachment element 41 arranged at the front of the worktable 40, to assume a stable working position.

The support section 27 is shown in FIG. 1 and is present on one, several or all horizontal frame elements 17A, 17B. The support section 27 includes a groove, especially a V-groove, in which the attachment element 41 can engage. The groove is preferably open at the top so that the attachment element 41 can engage in the groove from above. Expediently, the groove extends over the entire length of the horizontal frame element 17A, 17B.

Below, the container attachment interface 6 and the box-shaped container 80 are explained in more detail, with particular reference to FIG. 3. FIG. 3 shows transport vehicle 2 with at least one attached box-shaped container 80 and an attached worktable 40. This arrangement of the transport vehicle 2, container 80 and worktable 40 shall also be referred to as transport device 1.

The container attachment interface 6 serves to attach the box-shaped container 80 to the lower section 3, especially the bottom part 4, of the transport vehicle 2, preferably in such a way that the box-shaped container 80 is fixed in all spatial directions. Expediently, the container attachment interface 6 is designed in such a way that the container 80 can be attached to and/or detached from the container attachment interface 6 without using tools.

As an example, in FIG. 3, a vertical stack 90, comprising two box-shaped containers 80 stacked and coupled together, is placed on the support surface 5 and is attached to the lower section 3 by the container attachment interface 6.

As an example, the container attachment interface 6 has a movable coupling element 91, which is exemplarily designed as a rotary bolt, especially as a T-shaped rotary bolt. The movable coupling element 91 can be manually moved to different rotary positions in order to selectively establish or release the attachment of the container 80 to the transport vehicle 2.

The movable coupling element 91 is exemplarily attached to the front 10 of the lower section 3 and is preferably rotatably mounted, especially around a y-axis of rotation.

The container attachment interface 6 preferably further comprises a non-moving coupling structure 92, which exemplarily comprises two recesses arranged in the support surface 5. The non-movable coupling structure 92 can be engaged with lower container couplers described below.

Preferably, the container attachment interface 6 and/or the container 80 is designed in such a way that, in a state in which the container 80 is fixed to the transport vehicle 2, the container 80 is attached with its bottom and front side, in particular only with its bottom and front side, to the transport vehicle 2.

Now to the container 80:

The container 80 has a cuboid basic shape. As an example, the container 80 has a lower part 101 and a lid 102 which is placed on the lower part 101. The lid 102 is hinged to the lower part 101. Preferably the lower part 101 and the lid 102 have the same horizontal outer contour. A fold-out carrying handle 103 is provided on the top side of the container 80 as an example.

Figure 9:
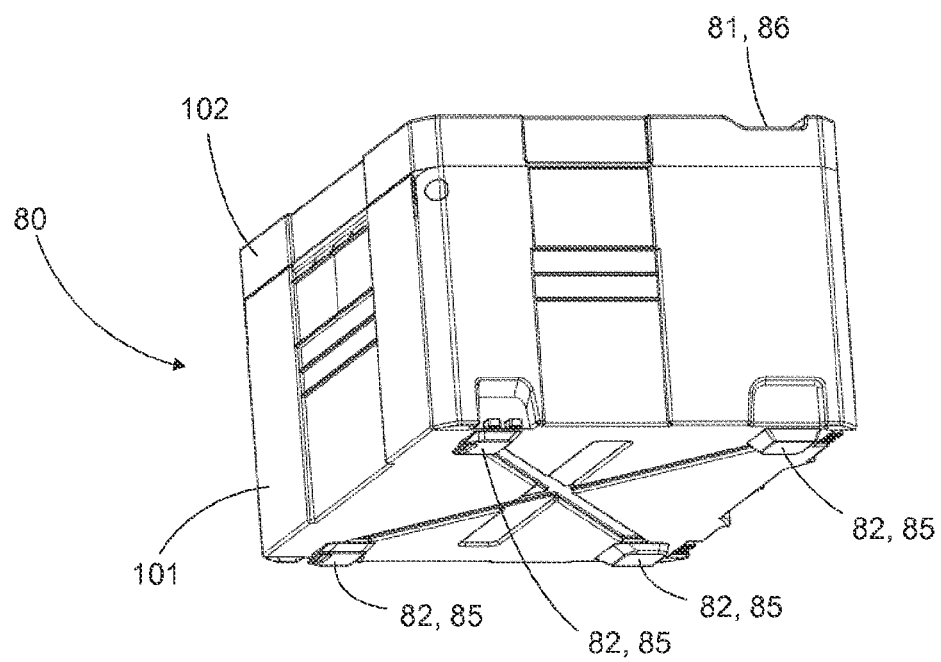
Figure 10:
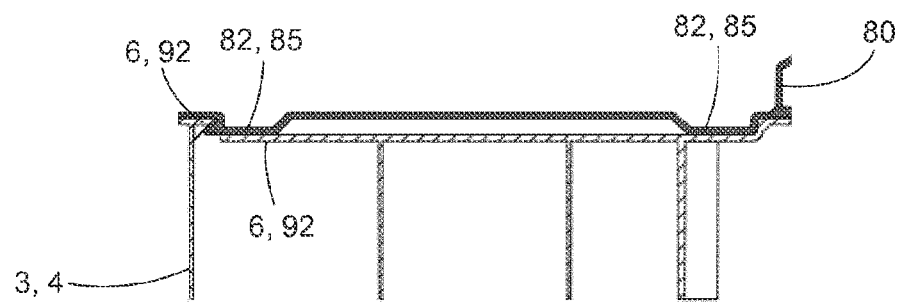
Figure 10:
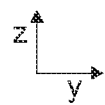
Figure 11:
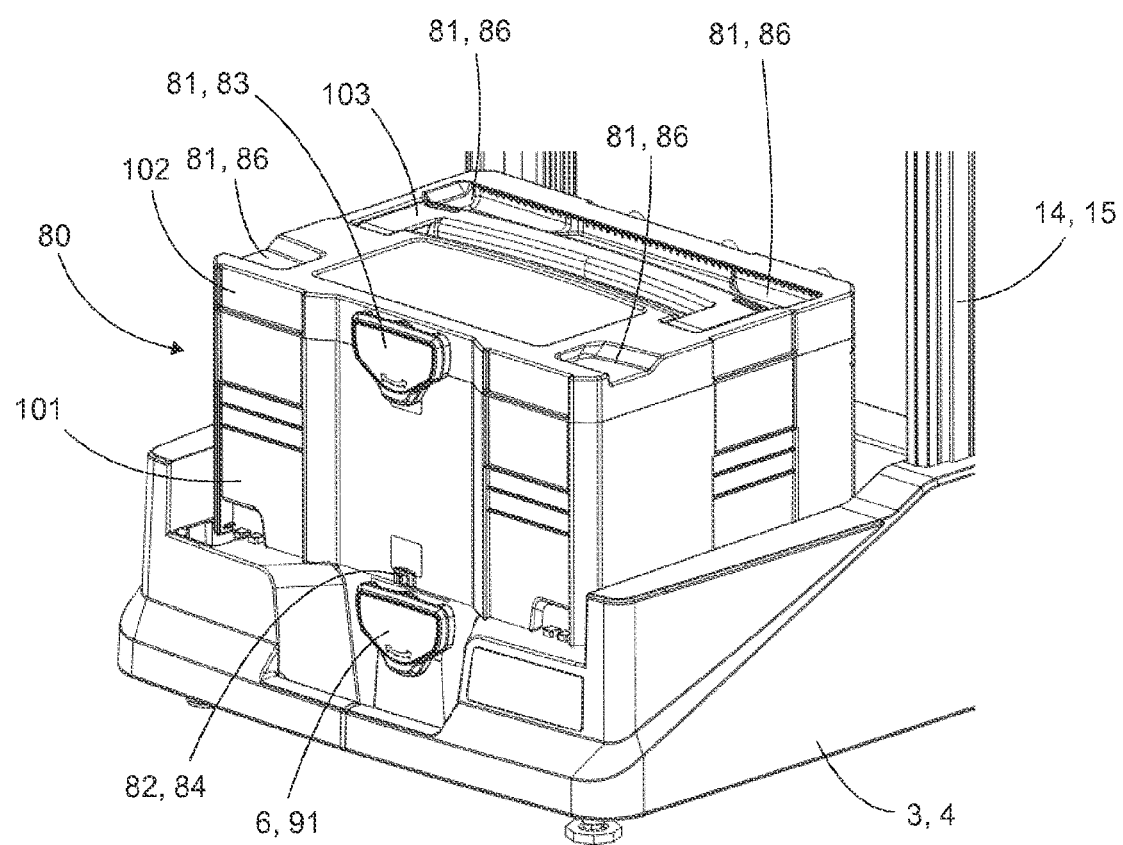
FIG. 11 a container placed on a support surface of the transport vehicle.

The container 80 has upper container couplers 81 and lower container couplers 82, which are shown especially in FIGS. 9 to 11. As an example, the upper container couplers 81 are designed to correspond to the lower container couplers 82, so that a further container 80 equipped with identical container couplers can be placed on the present container 80 and the lower container couplers 82 can be used to attach the further container 80 to the upper container couplers 81 of the 2s present container 80, in particular in such a way that the two containers 80 are fixed in all spatial directions with respect to each other and form a stable vertical stack 90.

The lower container couplers 82 comprise in particular a first non-movable coupling structure 84, for example a coupling projection which can be engaged with the movable coupling element 91. The non-movable coupling structure is located in particular at the front of the container 80.

The lower container couplers 82 further include a second non-movable coupling structure 85, such as feet that can engage with the non-movable coupling structure 92 and are located on the underside of the container 80.

FIG. 10 shows a vertical section through the box-shaped container 80 in a state in which its second non-moving coupling structure 85, designed as feet, engages with the non-moving coupling structure 92 of the container interface 6. As an example, the non-moving coupling structure 92 has a projection which is engaged behind by the feet, in particular the rear feet, expediently only the rear feet.

The upper container couplers 81 expediently comprise a movable coupling element 83, exemplarily a rotary bolt, in particular a T-shaped rotary bolt, which is expediently designed in correspondence to the movable coupling element 91. The movable coupling element 83 can be engaged in particular with the first non-movable coupling structure 84 of another container 80. Furthermore, the movable coupling element 83 can be used to lock the lid 102.

The upper container couplers 81 further preferably include a third non-moving coupling structure 86. The third non-moving coupling structure 86 can expediently engage with the second non-moving coupling structure 85 of a further container 80. The third non-moving coupling structure 86 preferably comprises one or more recesses and is located at the top of the container 80.

The container 80 is designed in particular in such a way that in a state in which the container 80 is fixed to a further container 80, the container 80 is attached with its bottom and front side, in particular only with its bottom and front side, to the further container 80.

The containers 80 described above may, for example, be designed in accordance with the containers described in EP2315701B1.

In the following, the possible configurations of the transport device 1 will be discussed.

Figure 7:
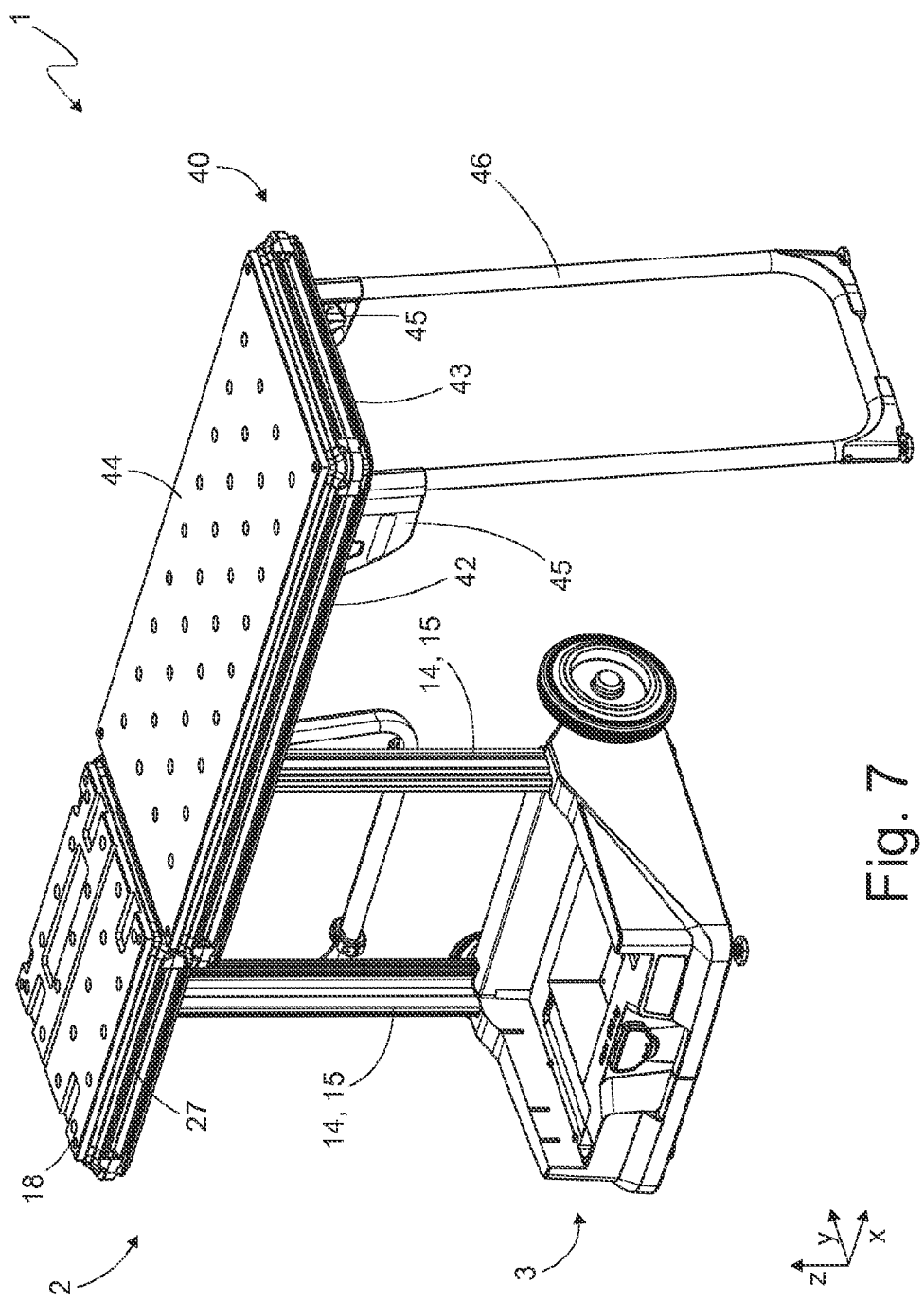
Figure 8:
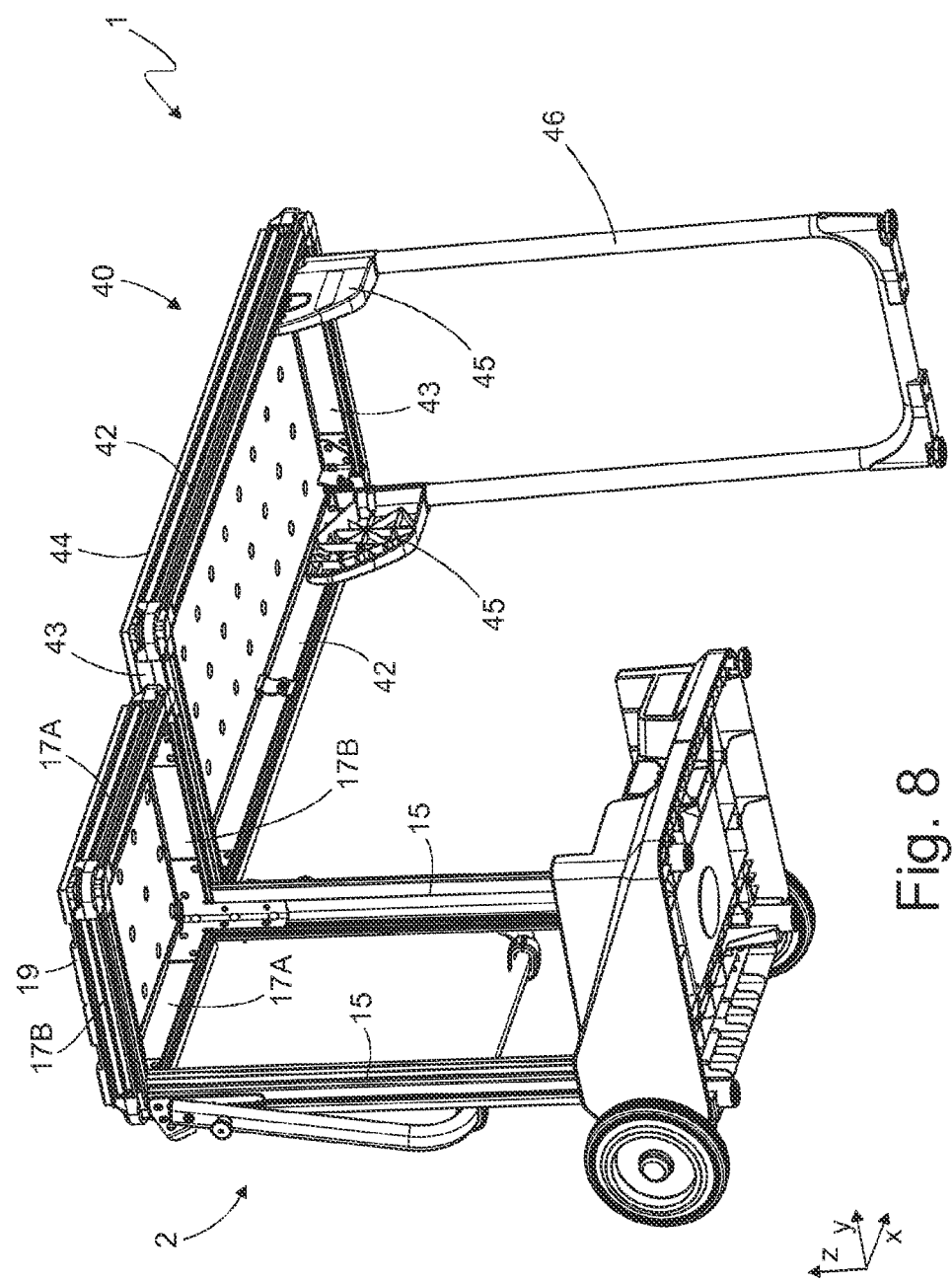

The transport device 1 equipped with the elongate worktable 40 can expediently assume at least two different configurations: a transport configuration in which the worktable 40 is attached in vertical orientation to the transport vehicle 2 as shown in FIG. 3 and a working configuration in which the worktable 40 is attached in horizontal orientation to the integrated table 18 as shown in FIGS. 7 and 8.

In the transport configuration, the worktable 40 (and in particular also the box-shaped container 80) is fixedly attached to the transport vehicle 2, so that, even in a driving position in which the transport device 1 is tilted with respect to the floor 30, the worktable 40 (and the box-shaped container 80) are stably mounted to the transport 2s vehicle 2 and can be transported by the transport vehicle 2.

Expediently, the elongate worktable 40 can be removed completely from the transport vehicle, in particular without the use of tools.

For attachment of the worktable 40 to the transport vehicle 2, the transport vehicle 2 is equipped with a worktable attachment interface 24, with which the elongate worktable 40 can be attached to the transport vehicle 2 in a vertical orientation in the rearward area 7 without the use of tools, in order to assume a transport position in which the elongate worktable 40 can be transported by the transport vehicle 2.

As shown in FIG. 3, in the transport position the worktable is aligned with its longitudinal axis vertically—i.e. in the z-direction. In the transport position, the table plane of the worktable 40 is aligned parallel to an x-z plane. The x-extension of the worktable 40 corresponds to the x-extension of the vertical frame section 14. In the transport position, the worktable 40 rests against the vertical frame section 14 and occupies the same x-area as the vertical frame section 14. In the z-direction, the worktable 40 extends in the transport position from the lower section 3 upwards and preferably projects above the transport vehicle 2, in particular the integrated table 18 and/or the handle 12.

In the transport position, the worktable 40 is arranged behind the vertical frame section 14 in the rearward direction—i.e. in the y-direction towards the rear side 8. In the y-direction, in the transport position, the worktable 40 is located on the side of the vertical frame section 14 facing the rear side 8. The support surface 5 is located on the other side as an example—i.e. on the side of the vertical frame section 14 facing the front side 10.

FIGS. 7 and 8 show the transport device 1 in a working configuration. In the working configuration, the worktable 40 is removed from the worktable attachment interface 24.

Furthermore, the worktable 40 is in a horizontal orientation; i.e., its table plane is parallel to an x-y plane. The position of the worktable 40 shown in FIGS. 7 and 8 can also be referred to as a stationary working position. In the working position, the worktable 40 is supported at one of its ends by the transport vehicle 2, in particular by the integrated table 18.

In FIGS. 7 and 8, the worktable 40 is attached on one longitudinal side 9 of the transport vehicle 2. The longitudinal axis of the worktable 40 is parallel to the y-direction. As an example, the worktable 40 is attached to the integrated table 18 and extends the integrated table 18 in the y-direction. In an x-y view, the worktable 40 and the integrated table 18 essentially form an elongate, rectangular shape whose x-extension is a multiple, in particular at least twice or three times, of the y-extension. The height of the worktable is preferably equal to the height of the integrated table 18. On the side facing away from the transport vehicle 2, the worktable 40 is supported by a table leg arrangement 46, which is explained in more detail below.

In the working configuration, the attachment element 41 expediently engages with its attachment arrangement 48 (explained below), in particular with the attachment projections 53, in the groove of the support section 27. In the working configuration, the worktable 40 can be removed from the transport vehicle 2 without the use of tools.

Expediently, a corresponding support section 27 is provided respectively on the front 10, the two longitudinal sides 9 and/or the rear side 8 of the transport vehicle 2, in particular the integrated table 18, on which corresponding support section 27 the worktable 40 can be supported. The worktable 40 can therefore be selectively attached to the front side 10, a first longitudinal side 9, a second longitudinal side 9 and/or the rear side 8.

Figure 4:
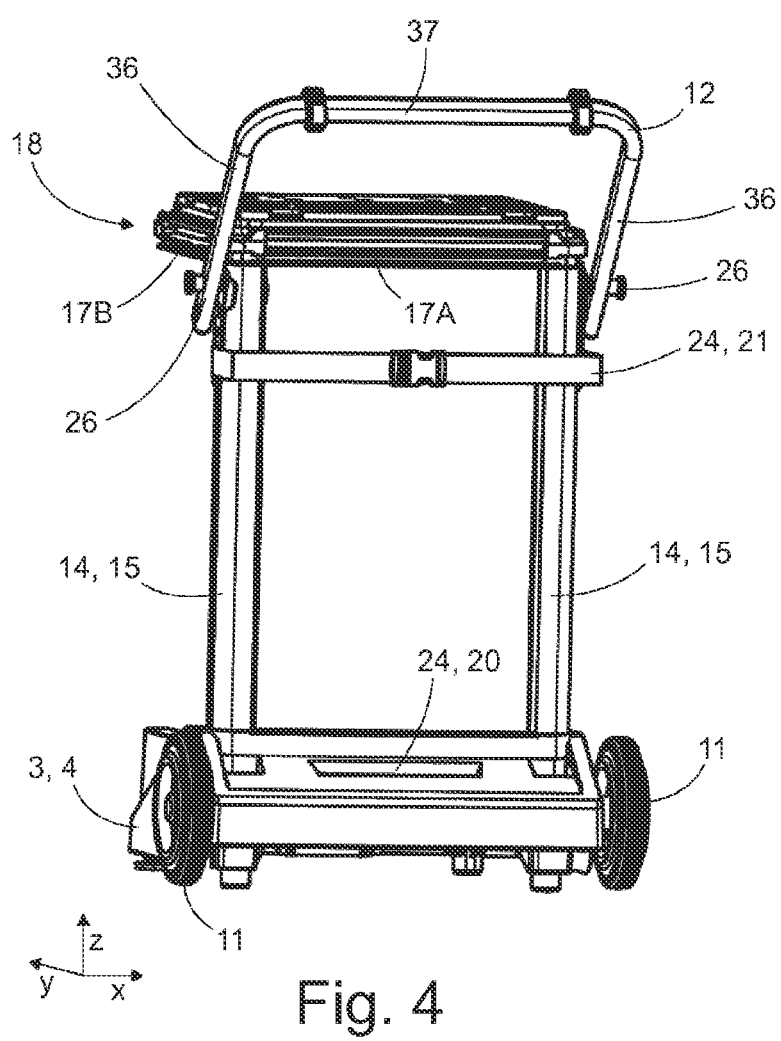

Next, the worktable attachment interface 24 will be discussed in more detail, with particular reference to FIGS. 4 to 6.

The worktable attachment interface 24 serves to attach the worktable 40 to the transport vehicle 2 in such a way that the worktable 40 can be stably transported by the transport vehicle 2. Preferably, the worktable attachment interface 24 is designed in such a way that the worktable 40, when attached, is fixed in all spatial directions relative to the transport vehicle 2.

The worktable attachment interface 24 includes a first attachment device 20 and a second attachment device 21. The two attachment devices 20, 21 are shown in FIG. 4, for example The first attachment device 20 is designed in such a way that the worktable 40 with the attachment element 41 can be mounted to the first attachment device 20 in a tilted orientation relative to the vertical frame section 14 and a vertical fixing to the first attachment device 20 is achieved by pivoting the worktable 40 towards the vertical frame section 14. With the second attachment device 21, the worktable 40 can then be fixed horizontally, in particular to the vertical frame section 14.

To remove the worktable 40, it is necessary to release the second attachment device 21 and pivot the worktable 40 away from the frame section 14 so that the worktable 40 is tilted relative to the vertical frame section 14. The worktable 40 can then be removed from the transport vehicle 2 by a linear movement in y-z direction.

In the following an exemplary design of the first attachment device 20 and the second attachment device 21 will be discussed in detail:

The first attachment device 20 is arranged at the lower section 3 and is located behind the vertical frame section 14 in the rearward direction. As an example, the first attachment device 20 includes an attachment structure 29 that engages the attachment element 41 to attach the worktable 40 to the worktable attachment interface 24.

Figure 5:
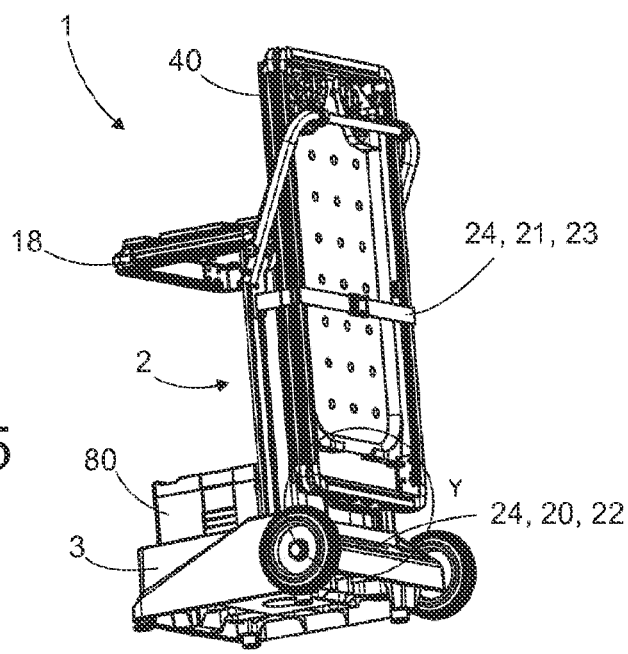
Figure 6:
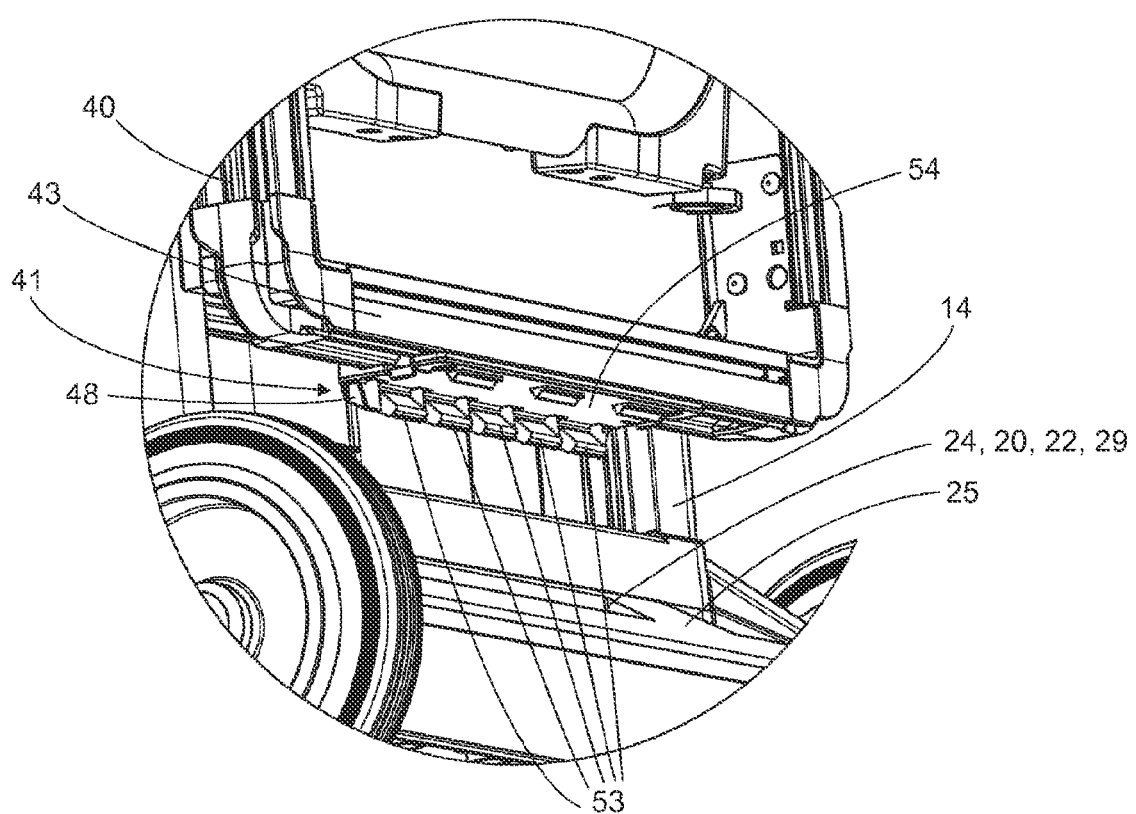

FIG. 6 shows the area marked "Y" in FIG. 5 in detail. For better visibility, the worktable 40 is shown in FIGS. 5 and 6 in a position where the attachment element 41 is not inserted into slot 22.

FIG. 6 shows in particular the first attachment device 20, which comprises a slot 22 extending in the x-direction, the slot serving to receive the attachment element 41. The slot 22 is expediently located immediately behind the vertical frame section 14 in the y-direction. The slot 22 is located on an angled upper side 25.

FIG. 6 further shows the attachment element 41. The attachment element 41 is located at one end of the worktable 40. As an example, the attachment element 41 is arranged on a transverse worktable frame element 43, which is designed as a profile element, as an example.

The attachment element 41 has an attachment arrangement 48. In a y-z side view (in the transport position of the worktable 40), the attachment arrangement 48 has an L-shaped basic shape. As an example, the attachment arrangement 48 comprises a plurality of L-shaped attachment projections 53 arranged side by side in the x-direction, each of which has a vertically extending first leg and a second leg extending obliquely downwards from the first leg in a y-z direction. As an example, the attachment arrangement 48 comprises five attachment projections 53, with two adjacent attachment projections 53 spaced apart in the x-direction. The attachment arrangement 48 can be inserted into the slot 22.

The attachment element 41 further has a plate-shaped section 54, by which the attachment element 41 is attached to the worktable frame element 43. On the side of the plate-shaped section 54 facing away from the worktable frame element 43, the attachment arrangement 48 is arranged. Expediently, the attachment element 41 is a one-piece part. The attachment arrangement 48, in particular the entire attachment element 41, is made of plastic.

The attachment structure 29 is accessible via the slot 22. The attachment arrangement 48 and the slot 22 are designed in such a way that the attachment arrangement 48 can only be inserted into the slot 22 in the above-mentioned tilted position of the worktable 40. The attachment structure 29 includes an attachment surface (not shown in the figures) that can be engaged with the attachment arrangement 48 inserted into the slot 22 by pivoting the worktable 40 so that the attachment arrangement 48 engages behind the attachment surface.

The worktable attachment interface 24 has a second attachment device 21, which is located on the vertical frame section 14. The second attachment device 21 is shown in particular in FIGS. 4 and 5. The second attachment device 21 is exemplarily located in the upper area of the vertical frame section 14. The second attachment device 21 comprises a belt 23, with which the worktable can be fixed in horizontal orientation to the vertical frame section 14 in the transport position. The belt 23 is exemplarily fixed at two anchoring points. The two anchoring points are at the same height. For example, the belt 23 is laid transverse around the worktable 40 in the transport position. In this position, the belt 23 has a U-shaped course in an x-y view. The belt 23 has a locking element 28 with which it can be opened to release or receive the worktable 40 and closed to secure the worktable 40. As an example, the locking element 28 is arranged in the x-direction in the center of belt 23.

In the following, the handle 12 will be explained in more detail, especially with reference to FIG. 4:

The handle 12 is expediently bow-shaped, especially U-shaped. The handle 12 has two outer sections 36, with which the handle is attached to the vertical frame section 14 so that the handle can be swiveled. The two outer sections 36 are connected by a central section 37 running in the x-direction.

The transport vehicle 2 is equipped with a positioning mechanism 26 with which the handle 12 can be positioned and fixed in at least two different swivel positions. As an example, the handle 12 can be fixed in three different swivel positions by the positioning mechanism.

In the following, the worktable 40 will be discussed in more detail, with particular reference to FIGS. 7 and 8.

The worktable 40 has an elongate, especially rectangular basic shape. Expediently, the worktable 40 is at least 1.5 times, especially twice as long as it is wide. The worktable 40 has a frame-shaped worktable frame, which includes longitudinal worktable frame elements 42 and transverse worktable frame elements 43. The longitudinal worktable frame elements 42 and the transverse worktable frame elements 43 are expediently bar-shaped and designed in particular as profiles, preferably as metal profiles. A table top 44 is mounted on the frame-shaped worktable frame.

The worktable 40 has the fold-out table leg arrangement 46, which is exemplary U-shaped. The (when folded out) vertical sections of the table leg arrangement 46 shall also be referred to as table legs. The table leg arrangement 46 is expediently located at the bottom side of the worktable 40, preferably in the area of one front side of the worktable 40. The table leg arrangement 46 is especially pivotally mounted at the worktable frame. The pivot axis of the table leg arrangement 46 is expediently aligned parallel to the transverse worktable frame elements 43. The worktable frame and the underside of the table top 44 define a accommodation volume that accommodates the table leg arrangement 46 in the folded state, in particular completely. The folded state of the table leg arrangement 46 can also be referred to as transport position and the unfolded state as working position.

The worktable 40 has fixing elements 45, with which the table leg arrangement 46 can be fixed in the working position. As an example, the fixing elements 45 are plate-shaped elements, which are each provided at the upper end on a table leg and are mounted so that they can rotate around the respective table leg.

The worktable 40 is designed to correspond to the integrated table 18. In particular, the worktable frame elements 42, 43 and the horizontal frame elements 17A, 17B of the integrated table 18 comprise the same profiles or profiles of the same type, preferably of the same cross-section, (but expediently of different lengths).

Preferably, the worktable frame elements 42, 43 further include one or more support sections 27, for example a groove, in particular a V-groove, on which one or more further worktables 40 can be supported with their attachment element 41.

Expediently, the table top 44 is equipped with a hole grid. Expediently, the hole grids of the two table tops 44, 19 have the same hole spacing.

In the following, a procedure for moving the transport device 1 from the transport configuration (see FIG. 3) to the working configuration (see FIG. 7) shall be described.

First, the attachment of the worktable 40 to the worktable attachment interface 24 is released. For this purpose, the second attachment device 21—here the belt 23—is released.

Furthermore, the first attachment device 20 is released by moving the worktable 40 in the direction away from the vertical frame section 14 into a predetermined tilting position. In order to enable this tilting position, the handle 12 is expediently moved into a corresponding swivel position.

The worktable 40 can then be completely removed from the transport vehicle 2. Next, the table leg arrangement 46 is unfolded and locked in the unfolded state by swiveling the fixing elements 45.

The worktable 40 is then brought into a horizontal orientation and attached to a support section 27 of the transport vehicle 2 with its attachment element 41. The transport device 1 is then in the working configuration.

The invention claimed is:

1. A transport device comprising a transport vehicle with:
    a vehicle body having a lower section and a vertical frame section extending upwardly from the lower section, the lower section having a support surface and a container attachment interface for attaching a box-shaped container placed on the support surface to the lower section without altering the vertical frame section;
    a handle arranged on the vehicle body for moving the transport vehicle into a tilted position;
    two wheels arranged on the lower section for supporting the transport vehicle in the tilted position relative to a floor and moving the transport vehicle relative to the floor; and
    a horizontally oriented integrated table located at the upper end of the vertical frame section and forming the upper end of the vehicle body,
the transport device further comprising:
    an elongate worktable and a worktable attachment interface provided on the transport vehicle for attaching the elongate worktable in a vertical orientation in a rearward area on the transport vehicle without the use of tools, in order to assume a transport position in which the elongate worktable can be transported by the transport vehicle, wherein the integrated table has a support section on which the worktable can be supported in a horizontal orientation with an attachment element of the worktable, to assume a stable working position.

2. The transport device according to claim 1, wherein the integrated table comprises a horizontal frame element disposed at the upper end of the vertical frame section and a table top disposed on the horizontal frame element.

3. The transport device according to claim 2, wherein the horizontal frame element serves as a stiffening element for the vertical frame section.

4. The transport device according to claim 2, wherein the vertical frame section comprises two elongated vertical frame elements extending vertically upward from the lower section in parallel with each other, and the horizontal frame element extends from the upper end of one vertical frame element to the upper end of the other vertical frame element.

5. The transport device according to claim 4, wherein the vertical frame elements are formed as profiles.

6. The transport device according to claim 2, wherein the horizontal frame element is part of a frame-shaped horizontal frame section arranged at the upper end of the vertical frame section.

7. The transport device according to claim 6, wherein the horizontal frame section comprises four elongated horizontal frame elements formed as profiles.

8. The transport device according to claim 1, wherein the vehicle body comprising the lower section, the vertical frame section and the integrated table constitutes a permanently integral structure which remains unchanged during the removal and/or attachment of a box-shaped container at the container attachment interface.

9. The transport device according to claim 1, wherein the vertical frame section is arranged in a rearward area of the transport vehicle.

10. The transport device according to claim 7, wherein the integrated table is supported relative to the lower section only by the vertical frame section located in the rearward area, so that in front of the vertical frame section and between the integrated table and the lower section there is a completely free volume for receiving one or more box-shaped containers.

11. The transport device according to claim 1, wherein the table top has a hole grid and/or recesses for receiving the feet of a container and/or a groove extending over the upper side of the table top.

12. The transport device according to claim 1, wherein the attachment element is arranged at a front side of the worktable.

13. The transport device according to claim 1, further comprising
    the box-shaped container arranged on the support surface and attached to the lower section by means of the container attachment interface.

14. The transport device according to claim 1, wherein, in the working position, the height of the worktable is equal to the height of the integrated table.

* * * * *